US006862664B2

(12) United States Patent
Tremblay et al.

(10) Patent No.: US 6,862,664 B2
(45) Date of Patent: Mar. 1, 2005

(54) METHOD AND APPARATUS FOR AVOIDING LOCKS BY SPECULATIVELY EXECUTING CRITICAL SECTIONS

(75) Inventors: Marc Tremblay, Menlo Park, CA (US); Shailender Chaudhry, San Francisco, CA (US); Quinn A. Jacobson, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 75 days.

(21) Appl. No.: 10/439,911

(22) Filed: May 16, 2003

(65) Prior Publication Data

US 2004/0162948 A1 Aug. 19, 2004

Related U.S. Application Data

(60) Provisional application No. 60/447,128, filed on Feb. 13, 2003.

(51) Int. Cl.$^7$ .............................................. G06F 12/00
(52) U.S. Cl. ..................................... 711/137; 711/163
(58) Field of Search ............................... 711/137, 145, 711/150–152, 163; 712/228; 718/102

(56) References Cited

U.S. PATENT DOCUMENTS 6,460,124 B1 * 10/2002 Kagi et al. .................. 711/163
2002/0087810 A1 * 7/2002 Boatright et al. ........... 711/145
2003/0079094 A1 * 4/2003 Rajwar et al. .............. 711/150

OTHER PUBLICATIONS

"Speculative Lock Elision: Enabling Highly Concurrent Multithreaded Execution" By Rajwar R. et al. Proceedings of the 34th Annual ACM/IEEE International Symposium on Microarchitecture, Austin, TX, Dec. 2001, pp. 294–305.*

"Improving the Throughput of Synchronization by Insertion of Delays" by Rajwar et al. Pro ceedings of the Sixth International Symposium on High–Performance Computer Architecture, Jan. 8–12, 2000, pp. 168–179.*

Publication: "Speculative Lock Elison: Enabling High Concurrent Multithreaded Execution" by Rajwar R. et al. Proceedings of the 34$^{th}$ Annual ACM/IEEE International Symposium on Microarchitecture, Austin TX, Dec. 1–5, 2001, International Symposium on Microarchitecture, Los Alamitos, CA: IEEE Comp. Soc, US, Dec. 1, 2001, pp. 294–305, XP001075852, ISBN: 0–7695–1369–7.

* cited by examiner

*Primary Examiner*—Pierre M. Vital
(74) *Attorney, Agent, or Firm*—Park, Vaughan & Fleming LLP

(57) ABSTRACT

One embodiment of the present invention provides a system that facilitates avoiding locks by speculatively executing critical sections of code. During operation, the system allows a process to speculatively execute a critical section of code within a program without first acquiring a lock associated with the critical section. If the process subsequently completes the critical section without encountering an interfering data access from another process, the system commits changes made during the speculative execution, and resumes normal non-speculative execution of the program past the critical section. Otherwise, if an interfering data access from another process is encountered during execution of the critical section, the system discards changes made during the speculative execution, and attempts to re-execute the critical section.

23 Claims, 5 Drawing Sheets

METHOD AND APPARATUS FOR AVOIDING LOCKS BY SPECULATIVELY EXECUTING CRITICAL SECTIONS

RELATED APPLICATIONS

This application hereby claims priority under 35 U.S.C. §119 to U.S. Provisional Patent Application No. 60/447,128, filed on 13 Feb. 2003, entitled "Transactional Memory," by inventors Shailender Chaudhry, Marc Tremblay and Quinn Jacobson.

BACKGROUND

1. Field of the Invention

The present invention relates to techniques for improving performance within computer systems. More specifically, the present invention relates to a method and an apparatus for avoiding the overhead involved in using locks by speculatively executing critical sections of code.

2. Related Art

Computer system designers are presently developing mechanisms to support multi-threading within the latest generation of Chip-Multiprocessors (CMPS) as well as more traditional Shared Memory Multiprocessors (SMPs). With proper hardware support, multi-threading can dramatically increase the performance of numerous applications. However, as microprocessor performance continues to increase, the time spent synchronizing between threads (processes) is becoming a large fraction of overall execution time. In fact, as multi-threaded applications begin to use even more threads, this synchronization overhead becomes the dominant factor in limiting application performance.

From a programmer's perspective, synchronization is generally accomplished through the use locks. A lock is typically acquired before a thread enters a critical section of code, and is then released after the thread exits the critical section. If another thread wants to enter the same critical section, it must attempt to acquire the same lock. If it is unable to acquire the lock, because a preceding thread has grabbed the lock, the thread must wait until the preceding thread releases the lock. (Note that a lock can be implemented in a number of ways, such as through atomic operations or semaphores.)

Unfortunately, the process of acquiring a lock and the process of releasing a lock are very time-consuming in modern microprocessors. They involve atomic operations, which typically flush the load buffer and store buffer, and can consequently require hundreds, if not thousands, of processor cycles to complete.

Moreover, as multi-threaded applications use more threads, more locks are required. For example, if multiple threads need to access a shared data structure, it is impractical for performance reasons to use a single lock for the entire data structure. Instead, it is preferable to use multiple fine-grained locks to lock small portions of the data structure. This allows multiple threads to operate on different portions of the data structure in parallel. However, it also requires a single thread to acquire and release multiple locks in order to access different portions of the data structure.

In some cases, locks are used when they are not required. For example, many applications make use of "thread-safe" library routines that use locks to ensure that they are "thread-safe" for multi-threaded applications. Unfortunately, the overhead involved in acquiring and releasing these locks is still incurred, even when the thread-safe library routines are called by a single-threaded application.

Applications typically use locks to ensure mutual exclusion within critical sections of code. However, in many cases threads will not interfere with each other, even if they are allowed to execute a critical section simultaneously. In these cases, mutual exclusion is used to prevent the unlikely case in which threads actually interfere with each other. Hence, in many cases, the overhead involved in acquiring and releasing locks is largely wasted.

What is needed is a method and an apparatus that reduces the overhead involved in manipulating locks when accessing critical sections of code.

SUMMARY

One embodiment of the present invention provides a system that facilitates avoiding locks by speculatively executing critical sections of code. During operation, the system allows a process to speculatively execute a critical section of code within a program without first acquiring a lock associated with the critical section. If the process subsequently completes the critical section without encountering an interfering data access from another process, the system commits changes made during the speculative execution, and resumes normal non-speculative execution of the program past the critical section. Otherwise, if an interfering data access from another process is encountered during execution of the critical section, the system discards changes made during the speculative execution, and attempts to re-execute the critical section.

In a variation on this embodiment, data accesses from other processes are allowed to proceed during the speculative execution of the critical section.

In a variation on this embodiment, attempting to re-execute the critical section involves speculatively re-executing the critical section.

In a variation on this embodiment, if the critical section is not successfully completed after a number of speculative attempts, the system acquires a lock associated with the critical section, and then non-speculatively executes the critical section. The system then releases the lock.

In a variation on this embodiment, prior to allowing the process to speculatively execute the critical section, the system performs a checkpointing operation to checkpoint register values and other state information associated with the process.

In a variation on this embodiment, upon executing a load operation during speculative execution of the critical section, the system "load marks" a corresponding cache line. Note that the corresponding cache line can be load marked in level 1 (L1) cache.

In a variation on this embodiment, upon executing a store operation during speculative execution of the critical section, the system prefetches the corresponding cache line for exclusive use, and also "store marks" the corresponding cache line. Note that the corresponding cache line can be store marked in the cache level closest to the processor where cache lines are coherent.

In a variation on this embodiment, the interfering data access can include: a store by another process to a cache line that has been load marked by the process; and a load or a store by another process to a cache line that has been store marked by the process.

In a variation on this embodiment, while committing changes made during speculative execution, the system clears load marks from cache lines and commits register file changes made during speculative execution. The system also treats store-marked cache lines as locked, thereby causing other processes to wait to access the store-marked cache lines. The system then commits store buffer entries generated during the speculative execution to memory, wherein committing each store buffer entry involves unmarking, and thereby unlocking, a corresponding cache line.

In a variation on this embodiment, while discarding changes made during the speculative execution, the system discards register file changes made during the speculative execution and clears load marks from cache lines. The system also drains store buffer entries generated during the speculative execution, and clears store marks from cache lines.

DETAILED DESCRIPTION

Figure 1:
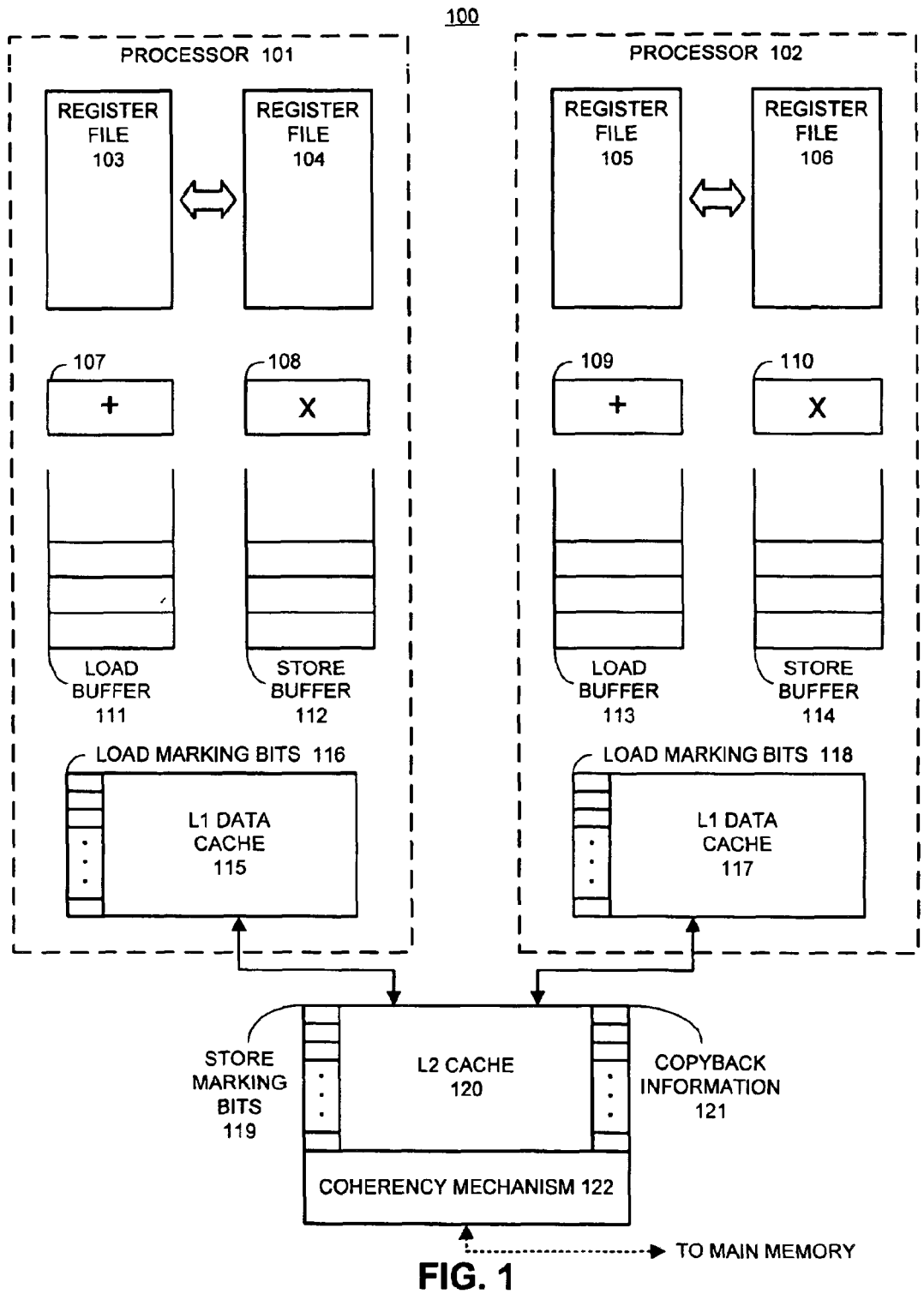
FIG. 1 illustrates a computer system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.
Computer System FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 1, computer system 100 includes processors 101 and level 2 (L2) cache 120, which is coupled to main memory (not shown). Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register checkpointing operation to support speculative execution.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that each line in L1 data cache 115 includes a "load marking bit," which indicates that a data value from the line has been loaded during speculative execution. This load marking bit is used to determine whether any interfering memory references take place during speculative execution as is described below with reference to FIGS. 3–8. Processor 101 also includes an L1 instruction cache (not shown).

Note that load marking does not necessarily have to take place in L1 data cache 115. In general load marking can take place at any level cache, such as L2 cache 120. However, for performance reasons, the load marking takes place at the cache level that is closest the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 122 maintains "copyback information" 121 for each cache line. This copyback information 121 facilitates sending a cache line from L2 cache 120 to a requesting processor in cases where the current version of the cache line must first be retrieved from another processor.

Each line in L2 cache 120 includes a "store marking bit," which indicates that a data value has been stored to the line during speculative execution. This store marking bit is used to determine whether any interfering memory references take place during speculative execution as is described below with reference to FIGS. 3–8. Note that store marking does not necessarily have to take place in L2 cache 120.

Figure 2:
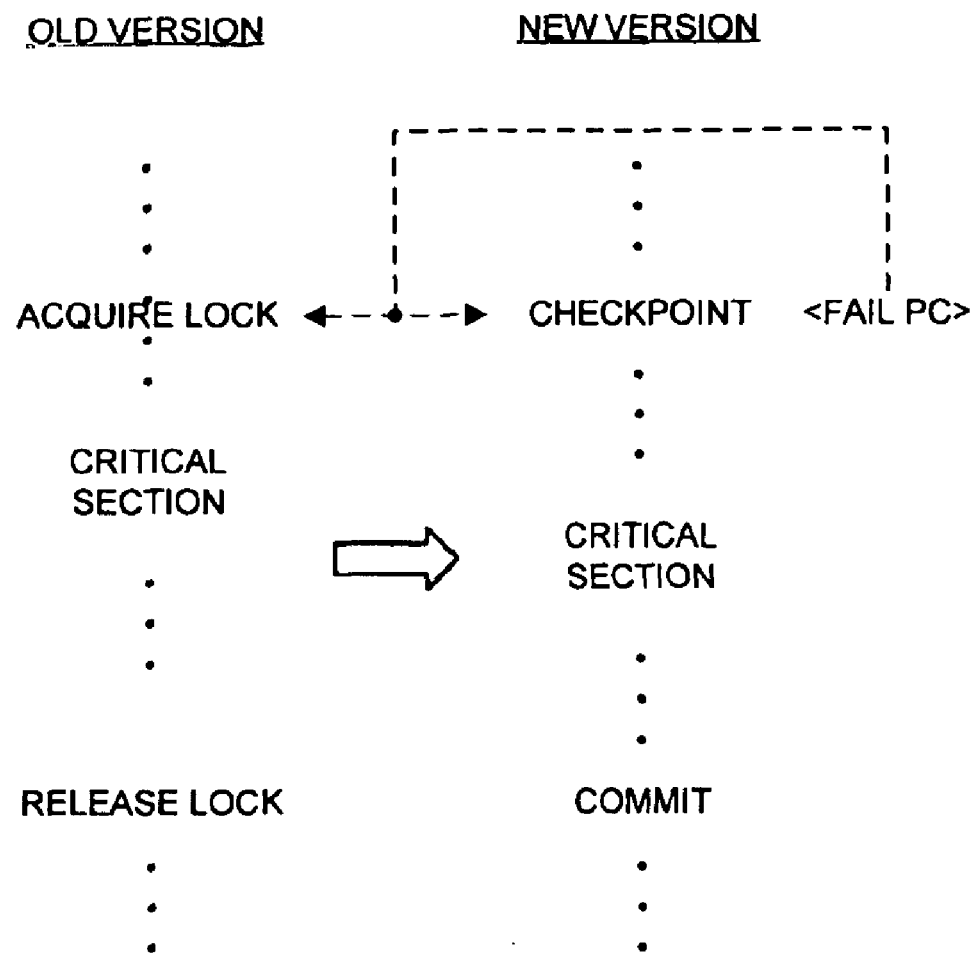
FIG. 2 illustrates how a critical section is executed in accordance with an embodiment of the present invention.

Ideally, the store marking takes place in the cache level closest to the processor where cache lines are coherent. For write-through L1 data caches, writes are automatically propagated to L2 cache 120. However, if an L1 data cache is a write-back cache, we perform store marking in the L1 data cache. (Note that the cache coherence protocol ensures that any other processor that subsequently modifies the same cache line will retrieve the cache line from the L1 cache, and will hence become aware of the store mark.)
Executing a Critical Section FIG. 2 illustrates how a critical section is executed in accordance with an embodiment of the present invention. As is illustrated in the left-hand side of FIG. 2, a process that executes a critical section typically acquires a lock associated with the critical section before entering the critical section. If the lock has been acquired by another process, the process may have to wait until the other process releases the lock. Upon leaving the critical section, the process releases the lock. (Note that the terms "thread" and "process" are used interchangeably throughout this specification.)

A lock can be associated with a shared data structure. For example, before accessing a shared data structure, a process can acquire a lock on the shared data structure. The process can then execute a critical section of code that accesses the shared data structure. After the process is finished accessing the shared data structure, the process releases the lock.

In contrast, in the present invention, the process does not acquire a lock, but instead executes a checkpoint instruction before entering the critical section. If the critical section is successfully completed without interference from other processes, the process performs a commit operation, to commit changes made during the speculative execution. This sequence of events is described in more detail below with reference to FIGS. 3–8.

Note that in one embodiment of the present invention a compiler replaces lock acquiring instructions with checkpoint instructions, and also replaces a corresponding lock releasing instructions with commit instructions. (Note that there may not be a one-to-one correspondence between replaced instructions. For example, a single lock acquisition operation comprised of multiple instructions may be replaced by a single checkpoint instruction.) The above discussion presumes that the processor's instruction set has been augmented to include a checkpoint instruction and a commit instruction. These instructions are described in more detail below with reference to FIGS. 4 and 7.

Speculative Execution Process

Figure 3:
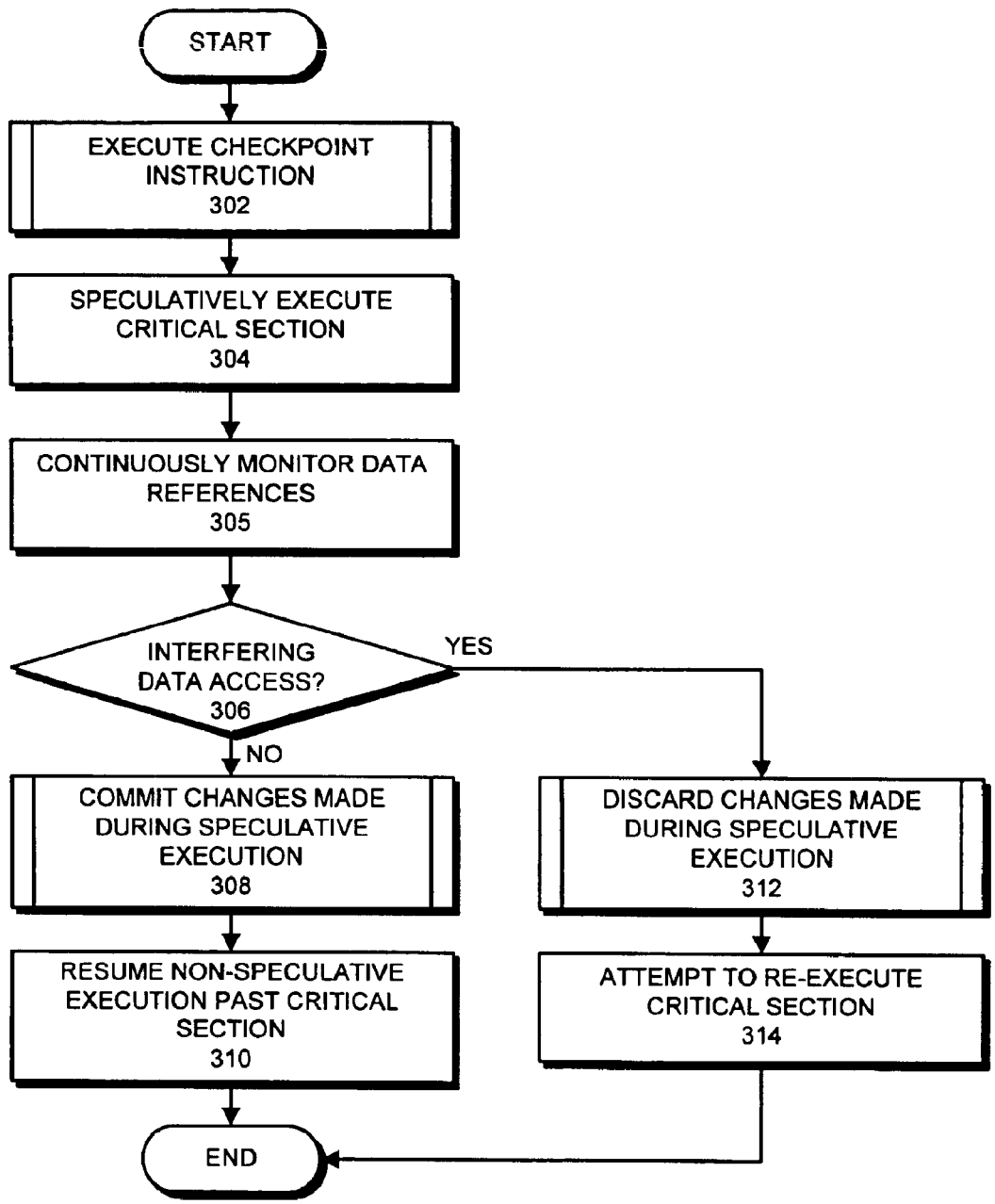
FIG. 3 presents a flow chart illustrating the speculative execution process in accordance with an embodiment of the present invention.

FIG. 3 presents a flow chart illustrating how speculative execution takes place in accordance with an embodiment of the present invention. A process first executes a checkpoint instruction prior to entering of a critical section of code (step 302). Next, the system speculatively executes code within the critical section, without committing results of the speculative execution (step 304).

During this speculative execution, the system continually monitors data references made by other processes (step 305), and determines if an interfering data access takes place during speculative execution (step 306). If not, the system commits changes made during speculative execution (step 308) and then resumes normal non-speculative execution of the program past the critical section (step 310).

On the other hand, if an interfering data access is detected, the system discards changes made during the speculative execution (step 312), and attempts to re-execute the critical section (step 314).

In one embodiment of the present invention, the system attempts the speculatively re-execute the critical section zero, one, two or more times. If these attempts are not successful, the system reverts back to the conventional technique of acquiring a lock on the critical section before entering the critical section, and then releasing the lock after leaving the critical section.

Note that an interfering data access can include a store by another process to a cache line that has been load marked by the process. It can also include a load or a store by another process to a cache line that has been store marked by the process.

Also note that circuitry to detect interfering data accesses can be easily implemented by making minor modifications to conventional cache coherence circuitry. This conventional cache coherence circuitry presently generates signals indicating whether a given cache line has been accessed by another processor. Hence, these signals can be used to determine whether an interfering data access has taken place.

Checkpointing Process

Figure 4:
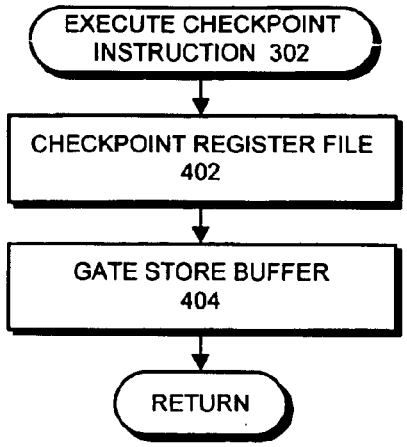
FIG. 4 presents a flow chart illustrating a checkpointing operation in accordance with an embodiment of the present invention.

FIG. 4 presents a flow chart illustrating a checkpoint operation in accordance with an embodiment of the present invention. This flow chart illustrates what takes place during step 302 of the flow chart in FIG. 3. The system starts by checkpointing the register file (step 402). This can involve performing a flash copy operation from register file 103 to register file 104 (see FIG. 1). In addition to checkpointing register values, this flash copy can also checkpoint various state registers associated with the currently executing process. In general, the flash copy operation checkpoints enough state to be able to restart the corresponding thread.

The checkpoint operation also causes store buffer 112 to become "gated" (step 404). This allows existing entries in store buffer to propagate to the memory sub-system, but prevents new store buffer entries generated during speculative execution from doing so.

Load Marking Process

Figure 5:
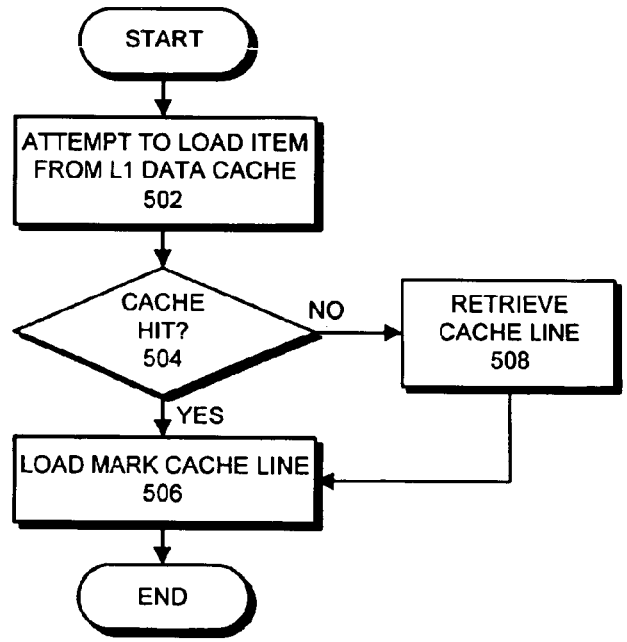
FIG. 5 presents a flow chart illustrating how load marking is performed during speculative execution in accordance with an embodiment of the present invention.

FIG. 5 presents a flow chart illustrating how load marking is performed during speculative execution in accordance with an embodiment of the present invention. During speculative execution of a critical section, the system performs a load operation. In performing this load operation, system first attempts to load a data item from L1 data cache 115 (step 502). If the load causes a cache hit, the system "load marks" the corresponding cache line in L1 data cache 115 (step 506). This involves setting the load marking bit for the cache line. Otherwise, if the load causes a cache miss, the system retrieves the cache line from lower levels of the memory hierarchy (step 508), and proceeds to step 506 to load mark the cache line in L1 data cache 115.

Store Marking Process

Figure 6:
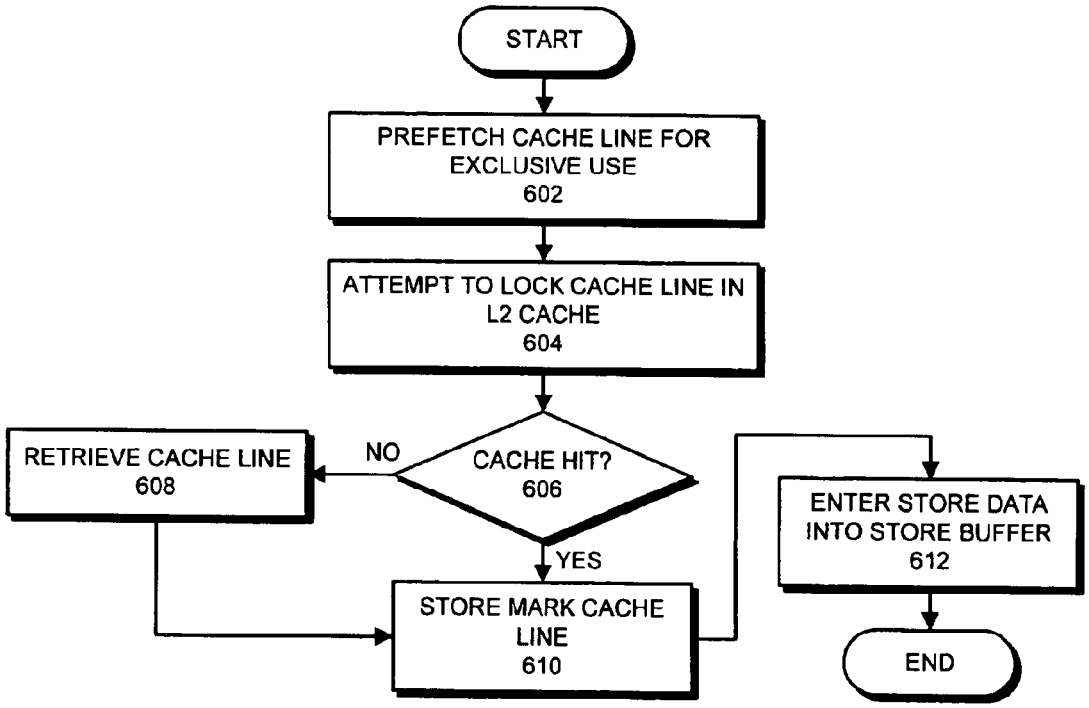
FIG. 6 presents a flow chart illustrating how store marking is performed during speculative execution in accordance with an embodiment of the present invention.

FIG. 6 presents a flow chart illustrating how store marking is performed during speculative execution in accordance with an embodiment of the present invention. During speculative execution of a critical section, the system performs a store operation. For this store operation, the system first prefetches a corresponding cache line for exclusive use (step 602). Note that this prefetch operation will do nothing if the line is already located in cache and is already in an exclusive use state.

Since in this example L1 data cache 115 is a write-through cache, the store operation propagates through L1 data cache 115 to L2 cache 120. The system then attempts to lock the cache line corresponding to the store operation in L2 data cache 115 (step 604). If the corresponding line is in L2 cache 120 (cache hit), the system "store marks" the corresponding cache line in L2 cache 120 (step 610). This involves setting the store marking bit for the cache line. Otherwise, if the corresponding line is not in L2 cache 120 (cache miss), the system retrieves the cache line from lower levels of the memory hierarchy (step 608) and then proceeds to step 610 to store mark the cache line in L2 cache 120.

Next, after the cache line is store marked in step 610, the system enters the store data into an entry of the store buffer 112 (step 612). Note that this store data will remain in store buffer 112 until a subsequent commit operation takes place, or until changes made during the speculative execution are discarded.

Commit Operation

Figures 7, 8:
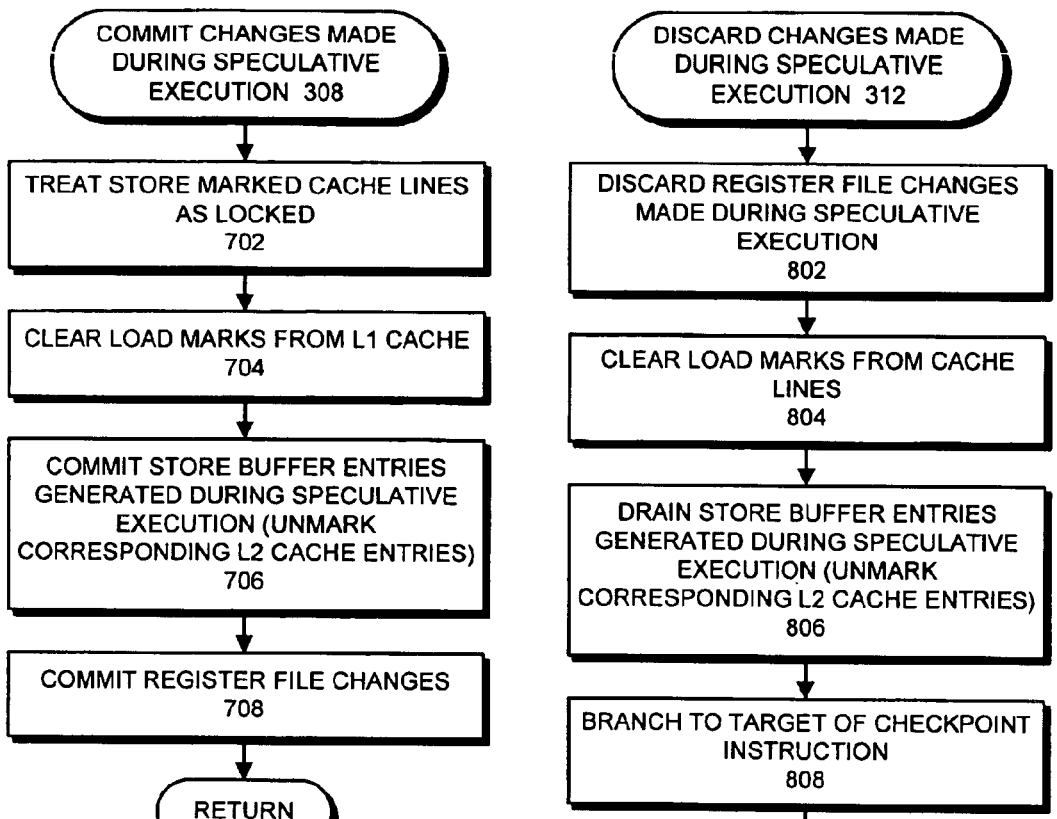
FIG. 7 presents a flow chart illustrating how a commit operation is performed after speculative execution completes successfully in accordance with an embodiment of the present invention.
FIG. 8 presents a flow chart illustrating how changes are discarded after speculative execution completes unsuccessfully in accordance with an embodiment of the present invention.

FIG. 7 presents a flow chart illustrating how a commit operation is performed after speculative execution completes successfully in accordance with an embodiment of the present invention. This flow chart illustrates what takes place during step 308 of the flow chart in FIG. 3.

The system starts by treating store-marked cache lines as though they are locked (step 702). This means other processes that request a store-marked line must wait until the line is no longer locked before they can access the line. This is similar to how lines are locked in conventional caches.

Next, the system clears load marks from L1 data cache 115 (step 704).

The system then commits entries from store buffer 112, which were generated during the speculative execution, into the memory hierarchy (step 706). As each entry is committed, a corresponding line in L2 cache 120 is unmarked.

The system also commits register file changes (step 708). For example, this can involve performing a flash copy between register file 103 and register file 104 in the system illustrated in FIG. 1.

Discarding Changes

FIG. 8 presents a flow chart illustrating how changes are discarded after speculative execution completes unsuccessfully in accordance with an embodiment of the present invention. This flow chart illustrates what takes place during step 312 of the flow chart in FIG. 3. The system first discards register file changes made during the speculative execution (step 802). This can involve either clearing or simply ignoring register file changes made during speculative execution. This is easy to accomplish because the old register values were checkpointed prior to commencing speculative execution. The system also clears load marks from cache lines in L1 data cache 115 (step 804), and drains store buffer entries generated during speculative execution without committing them to the memory hierarchy (step 806). At the same time, the system unmarks corresponding L2 cache lines. Finally, in one embodiment of the present invention, the system branches to a target location specified by the checkpoint instruction (step 808). The code at this target location attempts to re-execute the critical section as is described above with reference to step 314 of FIG. 1.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for avoiding locks by speculatively executing critical sections of code, comprising:

allowing a process to speculatively execute a critical section of code within a program without first acquiring a lock associated with the critical section;

wherein if the process completes the critical section without encountering an interfering data access from another process, the method further comprises:

committing changes made during the speculative execution, and resuming normal non-speculative execution of the program past the critical section; and wherein if an interfering data access from another process is encountered during execution of the critical section, the method further comprises:

discarding changes made during the speculative execution, and attempting to re-execute the critical section zero or more times;

wherein attemping to re-execute the critical section involves speculatively re-executing the critical section, wherein if the critical section is not successfully completed after a number of attempts at speculative execution, the method further comprises:

acquiring a lock associated with the critical section, non-speculatively executing the critical section, and releasing the lock associated with the critical section.

2. The method of claim 1, wherein data accesses from other processes are allowed to proceed during the speculative execution of he critical section.

3. The method of claim 1, wherein prior to allowing the process to speculatively execute the critical section, the method further comprises performing a checkpointing operation to checkpoint register values and other state information associated with the process.

4. The method of claim 1, wherein upon executing a load operation during speculative execution of the critical section, the method further comprises load marking a corresponding cache line.

5. The method of claim 4, wherein the corresponding cache line is load marked in level 1 (L1) cache.

6. The method of claim 1, wherein upon executing a store operation during speculative execution of the critical section, the method further comprises:

prefetching the corresponding cache line for exclusive use; and store marking the corresponding cache line.

7. The method of claim 6, wherein the corresponding cache line is store marked in the cache level closest to the processor where cache lines are coherent.

8. The method of claim 1, wherein the interfering data access can include:

a store by another process to a cache line that has been load marked by the process; and a load or a store by another process to a cache line that has been store marked by the process.

9. The method of claim 1, wherein prior to executing the critical section, the process performs a checkpointing operation that:

checkpoints an existing processor register file; and causes a store buffer for the process to become gated, so that the store buffer does not send out stores generated during the speculative execution.

10. The method of claim 1, wherein committing changes made during speculative execution involves:

treating store-marked cache lines as locked, thereby causing other processes to wait to access the store-marked cache lines;

clearing load marks from cache lines;

committing store buffer entries generated during the execution to memory, wherein committing each store buffer entry involves unmarking, and thereby unlocking, a corresponding cache line; and committing register file changes made during speculative execution.

11. The method of claim 1, wherein discarding changes made during the speculative execution involves:

discarding register file changes made during the speculative execution;

clearing load marks from cache lines;

draining store buffer entries generated during the speculative execution; and clearing store marks from cache lines.

12. An apparatus that avoids locks by speculatively executing critical sections of code, comprising:

a speculative execution mechanism configured to allow a process to speculatively execute a critical section of code within a program without first acquiring a lock associated with the critical section;

a commit mechanism, wherein if the process completes the critical section without encountering an interfering data access from another process, the commit mechanism is configured to:

commit changes made during the speculative execution, and to resume normal non-speculative execution of the program past the critical section; and a re-execution mechanism, wherein if an interfering data access from another process is encountered during execution of the critical section, the re-execution mechanism is configured to:

discard changes made during the speculative execution, and to attemp to re-execute the critical section zero or more times;

wherein the re-execution mechanism is configured to speculatively re-execute the critical section, wherein if the critical section is not successfully completed after a number of attempts at speculative execution, the re-execution mechanism is configured to:

acquire a lock associated with the critical section, non-speculatively execute the critical section, and to release the lock associated with the critical section.

13. The apparatus of claim 12, wherein the speculative execution mechanism is configured to allow data accesses from other processes to proceed during the speculative execution of the critical section.

14. The apparatus of claim 12, further comprising a checkpointing mechanism configured to checkpoint register values and other state information associated with the process prior to allowing the process to speculatively execute the critical section.

15. The apparatus of claim 12, wherein upon executing a load operation during speculative execution of the critical section, the speculative execution mechanism is configured to load mark a corresponding cache line.

16. The apparatus of claim 15, wherein the corresponding cache line is load marked in level 1 (L1) cache.

17. The apparatus of claim 12, wherein upon executing a store operation during speculative execution of the critical section, speculative execution mechanism is configured to:

prefetch the corresponding cache line for exclusive use; and to store mark the corresponding cache line.

18. The apparatus of claim 17, wherein the corresponding cache line is store marked in the cache level closest to the processor where cache lines are coherent.

19. The apparatus of claim 12, wherein the interfering data access can include:

a store by another process to a cache line that has been load marked by the process; and a load or a store by another process to a cache line that has been store marked by the process.

20. The apparatus of claim 12, further comprising a checkpointing mechanism, wherein prior execution of the critical section, the checkpointing mechanism is configured to:

checkpoint an existing processor register file; and to configure a store buffer for the process to become gated, so that the store buffer does not send out stores generated during the speculative execution.

21. The apparatus of claim 12, wherein while committing changes made during speculative execution, the commit mechanism is configured to:

treat store-marked cache lines as locked, thereby causing processes to wait to access the store-marked cache lines;

clear load marks from cache lines;

commit store buffer entries generated during the speculative execution, wherein committing each store buffer entry involves unmarking, and thereby unlocking, a corresponding cache line; and to commit register file changes made during speculative execution.

22. The apparatus of claim 12, wherein while discarding changes made during the speculative execution, the commit mechanism is configured to:

discard register file changes made during the speculative execution;

clear load marks from cache lines;

drain store buffer entries generated during the speculative execution; and to clear store marks from cache lines.

23. A computer system that facilitates avoiding locks by speculatively executing critical sections of code, comprising:

a processor;

a speculative execution mechanism within the processor configured to allow a process to speculatively execute a critical section of code within a program without first acquiring a lock associated with the critical section;

a commit mechanism within the processor, wherein if the process completes the critical section without encountering an interfering data access from another process, the commit mechanism is configured to:

commit changes made during the speculative execution, and to resume normal non-speculative execution of the program past the critical section; and a re-execution mechanism within the processor, wherein if an interfering data access from another process is encountered during execution of the critical section, the re-execution mechanism is configured to:

discard changes made during the speculative execution, and to attempt to re-execute the critical section zero or more times;

wherein the re-execution mechanism is configured to speculatively re-execute the critical section, wherein if the critical section is not successfully completed after a number of attempts at speculative execution, the re-execution mechanism is configured to:

acquire a lock associated with the critical section, non-speculatively execute the critical section, and to release the lock associated with the critical section.

* * * * *

UNITED STATES PATENT AND TRADEMARK OFFICE
CERTIFICATE OF CORRECTION

PATENT NO. : 6,862,664 B2
DATED : March 1, 2005
INVENTOR(S) : Marc Tremblay et al.

It is certified that error appears in the above-identified patent and that said Letters Patent is hereby corrected as shown below:

<u>Column 8,</u>
Line 12, please delete the word, "he" and replace with the word -- the --.

Signed and Sealed this

Tenth Day of May, 2005

JON W. DUDAS
*Director of the United States Patent and Trademark Office*